April 4, 1950

P. GLASS

ELECTRICAL CONTROL CIRCUIT EMPLOYING MAGNETIC AMPLIFICATION 2,503,039

Filed Sept. 17, 1945

2 Sheets-Sheet 1

INVENTOR.
Paul Glass,
BY
Chritton, Wiles, Schroeder, Merriam & Hofgren Attys.

April 4, 1950 P. GLASS 2,503,039

ELECTRICAL CONTROL CIRCUIT EMPLOYING MAGNETIC AMPLIFICATION

Filed Sept. 17, 1945

2 Sheets-Sheet 2

INVENTOR.
Paul Glass,
BY
Clarke, Wiles, Schneider, Merriam & Hofgren Atty's.

Patented Apr. 4, 1950

2,503,039

UNITED STATES PATENT OFFICE 2,503,039

ELECTRICAL CONTROL CIRCUIT EMPLOYING MAGNETIC AMPLIFICATION

Paul Glass, Chicago, Ill., assignor to Askania Regulator Company, Chicago, Ill., a corporation of Illinois Application September 17, 1945, Serial No. 616,827

25 Claims. (Cl. 179—171)

The invention relates generally to electrical control circuits and more particularly to control circuits wherein a small signal is utilized to govern substantially larger power application or where the signal is amplified or modified, or both, for subsequent use in its amplified and/or modified form.

Heretofore circuits of the character described have depended largely upon electron tubes for accomplishment of the ends sought, necessitating complicated circuits or excessive numbers of stages of amplification with the resultant disadvantages of high cost, operational and maintenance difficulties and, above all, the disadvantage that the controlling portion of the circuit was not completely independent of the controlled portion so that reaction in the controlled portion might reflect into the controlling portion with possible resultant injury thereto.

It is an object of this invention, therefore, to provide new and improved circuits for the amplification or modification, or both, of a signal or for the utilization of a small signal in the control of substantially larger power application.

Another object of the invention is to provide new and improved electrical control circuits adaptable to respond either to alternating current or direct current signals and adaptable to produce either direct or alternating current.

Another object is to provide new and improved electrical control circuits in which the input or controlling circuit is completely separated electrically from the output or controlled circuit and cannot be influenced by the output circuit.

Another object is to provide a new and improved circuit of the character described having an electron tubeless, main amplification or control stage and an input signal circuit in advance of the main stage conditioning the signal by modification and possibly also amplification for use in connection with the main stage.

Still another object is to provide a new and improved control circuit in which the main amplification and control means is composed of saturable reactors.

A further object is to provide a control circuit, including saturable reactors, which will function, under the control of either a D. C. or an A. C. signal, to produce a D. C. output varying in magnitude and sign with the magnitude and sign of the signal.

Yet a further object is to provide a control circuit, including saturable reactors, which will function, under the control of either a D. C. or an A. C. signal, to produce an A. C. output varying in magnitude with the magnitude of the signal, the output being at one or the other of two output stations dependent upon the sign of the signal.

Other objects and advantages will become apparent from the following detailed description taken in connection with the accompanying drawings, in which.

Figures 1, 2, 3, 4, 5:
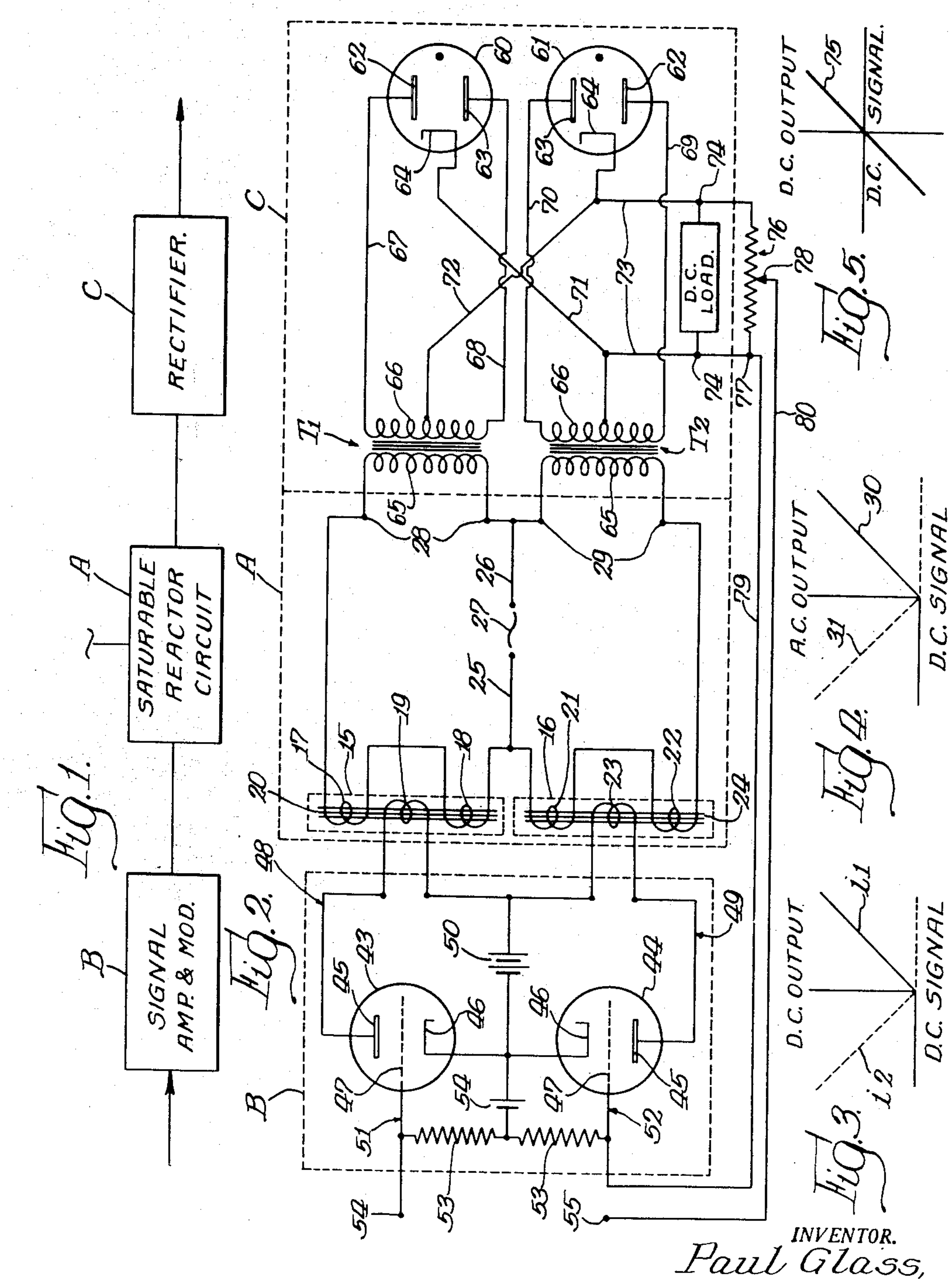
Fig. 1 is a box-type diagrammatic illustration of a circuit embodying the features of this invention.
Fig. 2 is a circuit diagram illustrating in detail a possible construction that the units represented by the rectangles in Fig. 1 may take.
Fig. 3 is a diagram illustrating the character of the output of the first unit of the circuit.
Fig. 4 is a diagram similar to Fig. 3 illustrating the character of the output of the second unit of the circuit.
Fig. 5 is a diagram similar to Fig. 3 illustrating the character of the final output of the circuit.

For purposes of disclosure there is shown in the drawings and will hereinafter be described a general and several specific circuits, being illustrative embodiments of the invention. It is not intended, however, that the invention is to be limited thereby to the specific disclosures made. On the contrary, it is intended to cover all modifications and alternative constructions falling within the spirit and scope of the invention as defined in the appended claims.

Generally speaking, the invention contemplates the provision of a new and improved circuit wherein a small electrical signal is utilized to govern substantially larger power applications or where the signal is amplified or modified, possibly both, for subsequent use in its new form. In such a circuit the input is a controlling signal while the output is a controlled signal regardless of whether the latter is of a magnitude commonly referred to as a signal or is of such magnitude as to be, or is in fact, the operating energy for an electrical device such as a motor or the like. To that end, the circuit is composed generally of means for modifying and possibly amplifying the controlling or the controlled signal, and means functioning as the main amplifying or control means.

Herein the general circuit (see Fig. 1) is composed of three subcircuits or circuit units or portions A, B and C. Of these units, A is the main amplifying or control means or circuit and functions to have an alternating current output controlled as to magnitude and sign by the controlling or input signal, but having an independent power source so that the absolute power output is not limited by the power of the signal source. Unit B is the control signal receiving unit. This unit usually functions to amplify the signal but, above all, it modifies the character of the signal so as first to obtain a signal of a character suitable for use with unit A, and, secondly, to obtain a signal of such character as to result in an output of a character desired. Herein the resultant signal is always a D. C. signal and is proportional in magnitude to the magnitude of the input signal. Unit C is also a modifier of the signal which it receives, though herein the function of unit C is always that of a rectifier converting the A. C. output of unit A to a D. C. output. The term "direct current" or its abbreviation D. C., as herein employed to designate the output of the units C and B and the control coils of the unit A, is used in the broad sense of that term, i. e., as opposed to alternating current and as including pulsating current such as produced by a generator or rectifier and not in the limited sense only of absolutely continuous, pulse-free current such as produced by a chemical cell under constant load.

As the description proceeds, it will become apparent that by appropriate construction of the unit B and by use or elimination of the unit C the invention may be employed to respond either to an A. C. or a D. C. input or control signal, while obtaining either an A. C. or a D. C. output. Moreover, by the employment of A. C. or D. C. signal receiving units B of the character hereinafter described, circuits embodying the concept of this invention may be employed to obtain an A. C. output which is directly proportional in magnitude to the magnitude of the input signal and regardless of whether that be an A. C. or a D. C. signal; and similarly a D. C. output may be obtained which also is proportional to the input signal and regardless of whether the same is an A. C. or a D. C. signal. In the case of the A. C. output, this is herein made available at one or the other of two stations dependent upon the sign of the signal. In the case of the D. C. output, the sign thereof is controlled by the sign of the input signal, and as to this the circuit acts as a reversing switch. The meaning of the term "sign" as applied to D. C. signals or output is, of course, the customary meaning and hence will be understood. The meaning herein of the term "sign" as applied to an A. C. signal or output is that of 180° phase displacement. Thus circuits embodying the concept of this invention may be employed as D. C. amplifiers, as amplifiers and converters of A. C. signals to D. C. signals, or as means for controlling the magnitude of A. C. output and the station of output by either A. C. or D. C. signals. In speaking of A. C. or D. C. currents or outputs, average and effective and not instantaneous values or magnitudes are intended.

Turning now to a consideration of the more detailed embodiments of the invention, the unit A will first be described. This unit, as already stated, is the main amplification stage and control unit or subcircuit and accomplishes control of the magnitude of the output and its availability at one or the other of two stations in accordance with the magnitude and sign of the signal without the employment of electron tubes. The unit A is the same in all of the circuits disclosed herein and it will thus be described in detail but once in connection with the description of the circuit disclosed in Fig. 2. Referring to Fig. 2, the unit A comprises a pair of saturable reactors represented by the broken-line rectangles 15 and 16. The saturable reactor 15 is composed of a pair of A. C. coils 17 and 18 and of a D. C. or control coil 19. All of the coils are wound on a common iron core 20 in such manner that current flowing in the coils 17 and 18 will not induce current or voltage in the D. C. coil 19, while flux produced by direct current flowing in the D. C. coil 19 will vary the impedance of the A. C. coils 17 and 18 by varying the degree of saturation of the core 20. The reactor is further so designed that the coils 17 and 18 have a very high impedance when no current is flowing in the D. C. coil 19. Necessarily the reactor and particularly the coils thereof must be designed with a view to the voltages with which it is to be employed, with the coils 17 and 18 being capable of taking substantially the full applied voltage when no current is flowing in the D. C. coil 19. The saturable reactor 16 is identical with the reactor 15 and comprises A. C. coils 21 and 22 and a D. C. or control coil 23, all wound on a common iron core 24.

The unit A, sometimes hereinafter referred to as the saturable reactor circuit, is completed by an A. C. supply circuit comprising power supply leads 25 and 26 adapted to be connected to an A. C. power source represented at 27 and two output stations herein represented by pairs of terminals 28 and 29, the unit A thus being adapted for the connection thereto of two loads. The A. C. coils of the saturable reactors are so connected in the supply circuit that one of the pairs of terminals 28, 29 will be subjected to varying proportions of the potential of the power source while the other will have small or negligible potential, depending upon which of the reactors has its control coil energized at the time. To that end, the saturable reactors, that is, the A. C. coils thereof, are connected in separate yet interconnected circuits each having the A. C. coils of one reactor, the terminals representing one station, and the A. C. power source in series with the power source common to the two circuits. Herein the terminals 28 are connected in series with the coils 17 and 18 of the saturable reactor 15, the coils also being in series, and the terminals 29 are in series with the coils 21 and 22 of the saturable reactor 16, the coils again being also in series. Inasmuch as the saturable reactors are designed so as to be capable of taking substantially the full applied voltage of the power source 27 when the control coils 19 are not energized, it follows that energization of one or the other of the control coils 19 will determine which of the pairs of terminals 28 and 29 will have such a small voltage applied thereto as to be incapable of energizing a load connected to the terminals and which of the terminals on the other hand will have an effective potential.

In the embodiment of the invention shown in Fig. 2, the circuit is adapted to respond to a D. C. input or control signal. Accordingly, there is illustrated, by way of example, a unit B which is operable to receive a D. C. signal, amplify the same to a magnitude suitable for use in connection with the saturable reactors 15 and 16 and, at the same time, cause energization of one or the other of the D. C. coils 19 and 23, depending upon the sign of the input signal, but never both coils simultaneously. Herein the unit B is of such character that an input signal will cause energization of the D. C. coils 19 and 23, as shown in Fig. 3, wherein the line $i1$ represents the current flowing in the coil 19 and $i2$ represents the current flowing in the coil 23. In other words, when the input signal is zero, the current in each of the coils 19 and 23 will also be zero. With an increase in signal magnitude, the current in one of the coils 19 or 23 will increase proportionally while the current in the other of the control coils will remain at zero. Which of the coils 19 or 23 will be energized and which will remain deenergized will be determined by the sign of the input signal.

While a unit B capable of producing currents in the coils 19 and 23 of the character described might take a variety of forms, one such unit is shown in Fig. 2, it being understood that the showing is exemplary only and that a variety of other subcircuits might be employed and that, in particular, it might prove necessary to have more than one stage to produce the amplification of the signal required to provide direct currents of a magnitude suitable for control of saturable reactors. Herein the unit B or signal input circuit comprises a pair of electron tubes 43 and 44 each having a plate 45, a cathode 46 and a grid 47. The tube 43 has a plate circuit, generally designated 48, which includes the D. C. coil 19 of the saturable reactor 15 and the tube 44 has a plate circuit, generally designated 49, which includes the D. C. coil 23 of the saturable reactor 16. A D. C. voltage source, herein shown as a battery 50 common to the two plate circuits 48 and 49, supplies the plate voltage of the tubes. Each of the tubes 43 and 44 has a grid circuit, generally designated 51 and 52, respectively, with each circuit including a resistance 53 and a grid bias voltage source, here shown as a battery 54, common to the two grid circuits. The D. C. signal input terminals 54 and 55 are connected to the not common ends of the resistance 53. As is apparent from Fig. 3, the tubes 43 and 44 are so biased as to cut off at zero signal. It is to be understood that the tubes 43 and 44 are provided with suitable means for heating the cathodes though not here shown.

For ready understanding of this invention, the operation of the circuit as thus far described will now be set forth. Let it be assumed, therefore, that the input signal is zero. Under this assumption, no current will be flowing in either of the coils 19 or 23. The saturable reactors 15 and 16 will thus be at full impedance and there will be no material difference in potential across either pair of output terminals 28, 29. Let it next be assumed that the sign or polarity of the D. C. input signal is such that an increase in signal magnitude falls to the right of the vertical axis of the graph of Fig. 3. Under those circumstances, the tube 43 will conduct and the current $i1$ flowing in the D. C. coil 19 will take on a value proportional to the magnitude of the signal. The current $i2$ flowing in the coil 23 will remain at zero. With such flow of current in the coil 19, the impedance of the A. C. coils 17 and 18 associated therewith will decrease correspondingly and there will be a correspondingly smaller voltage drop across those coils and hence an increase in potential difference across the terminals 28. This potential difference will be proportional to the signal magnitude. The output at terminals 29 will, however, remain at zero or substantially so because there has been no change in the impedance of the coils 21 and 22, for the current flow in the control coil 23 is still zero.

If now it be assumed that the sign or polarity of the input signal is reversed, it will be noted that just the opposite occurs. Tube 44 will now conduct while tube 43 will cut off. As a result, a current, as represented by $i2$ in Fig. 3, varying with the magnitude of the signal, will now flow in control coil 23 while the current in the coil 19 will become zero. Under these conditions, the impedance of the coils 21 and 22 of the reactor 16 is decreased proportionally as the current in the control coil and hence as the signal increases, while the impedance of the coils 17 and 18 of the reactor 15 is restored to its normal high value. There results a potential difference across the terminals 29 which increases as the signal increases in magnitude, whereas the potential difference across the terminals 28 is zero or substantially so. As a consequence, there results a circuit having an alternating current output of the character shown in Fig. 4, in which the line 30 represents the output at the terminals 28 and the line 31 represents the output at the terminals 29. The output, whether at terminals 28 or 29, is proportional to the magnitude of the input signal and which of the terminals has the output is determined by the sign or polarity of the D. C. input signal. Thus the circuit of Fig. 2 so far described results in control similar to that of a selecting rheostat or potentiometer, but obtains that control by means of a D. C. signal.

In this connection, it is pointed out that with the A. C. coils of the saturable reactors so connected as to prevent their inducing any voltage in the associated D. C. coil, the saturable reactor circuit is incapable of influencing the signal input circuit and thus reactions of the controlled signal, that is, the output of the saturable reactor circuit, be it of a character to be classified as a signal or be it the actual power supplied to a load, such as a motor or the like, cannot be reflected back into the signal input circuit.

In the embodiment of the invention shown in Fig. 2, the unit C is connected as the A. C. loads of the saturable reactor circuit. Herein, as already stated, the unit C is a rectifier and is, moreover, a rectifier which gives full wave rectified output. It is, moreover, of such construction that it takes the A. C. output of the saturable reactor unit A and converts the same to direct current the polarity of which is controlled by the sign of the input signal. Herein the rectifier unit C is composed of two gaseous type, full wave rectifier tubes 60 and 61 each having a pair of plates 62 and 63 and a cathode 64. The rectifier unit is inductively coupled to the saturable reactor circuit through the medium of a pair of transformers T1 and T2 each having a primary winding 65 and a secondary winding 66. The primary winding of the transformer T1 is connected to the terminals 28 and the primary winding of the transformer T2 is connected to the terminals 29 of the saturable reactor unit A. The tubes 60 and 61 are connected to operate in such manner that the D. C. output will be of one sign or polarity when the A. C. output is at the terminals 28, and of the opposite polarity when the A. C. output is at the terminals 29. To that end, the plates 62 and 63 of the tube 60 are by leads 67 and 68, respectively, connected to the ends of the secondary winding 66 of the transformer T1, and the plates 62 and 63 of the tube 61 are by leads 69 and 70, respectively, connected to the opposite ends of the secondary winding of the transformer T2. The cathode 64 of the tube 60 is by a lead 71 connected to the midpoint of the secondary winding of the transformer T2, while the cathode of tube 61 is by a lead 72 connected to the midpoint of the secondary winding of the transformer T1. Power output leads 73 are connected to the leads 71 and 72 and end in terminals 74 constituting the D. C. output terminals to which a D. C. load is shown connected. With a rectifier of the character here disclosed, the tube 60 will fire during both the positive and the negative half cycle of the output from the terminals 28. Similarly, the tube 61 will fire during both the positive and the negative half cycles of the output from the terminals 29 and thus in each instance full wave rectified output is obtained at the output terminals 74 of the rectifier but the polarity of the output will be reversed. Since full wave rectified output is obtained, it will be proportional in magnitude to the magnitude of the output of the saturable reactor circuit and, since the output of the reactor circuit is proportional to the magnitude of the input signal, the output at terminals 74 will also be proportional to the magnitude of the input signal. Further, the D.C. output of the rectifier circuit will vary in polarity with the polarity of the input signal and thus there results an output such as represented by the line 75 of Fig. 5, namely, a D. C. output which is proportional to the magnitude of the input signal and corresponding in sign to the sign of the input signal.

The complete circuit of Fig. 2 lends itself to the employment of a negative feed-back, thereby assuring a stable and linear D. C. amplifier. To that end, a potentiometer, generally designated 76, is connected across the output terminals 74 of the rectifier circuit. One end terminal 77 and the variable terminal or contact 78 of the potentiometer are, by leads 79 and 80, respectively, connected into the input circuit intermediate the terminal 55 and the resistance 53 in such manner as to serve as a negative feed-back.

Figure 6:
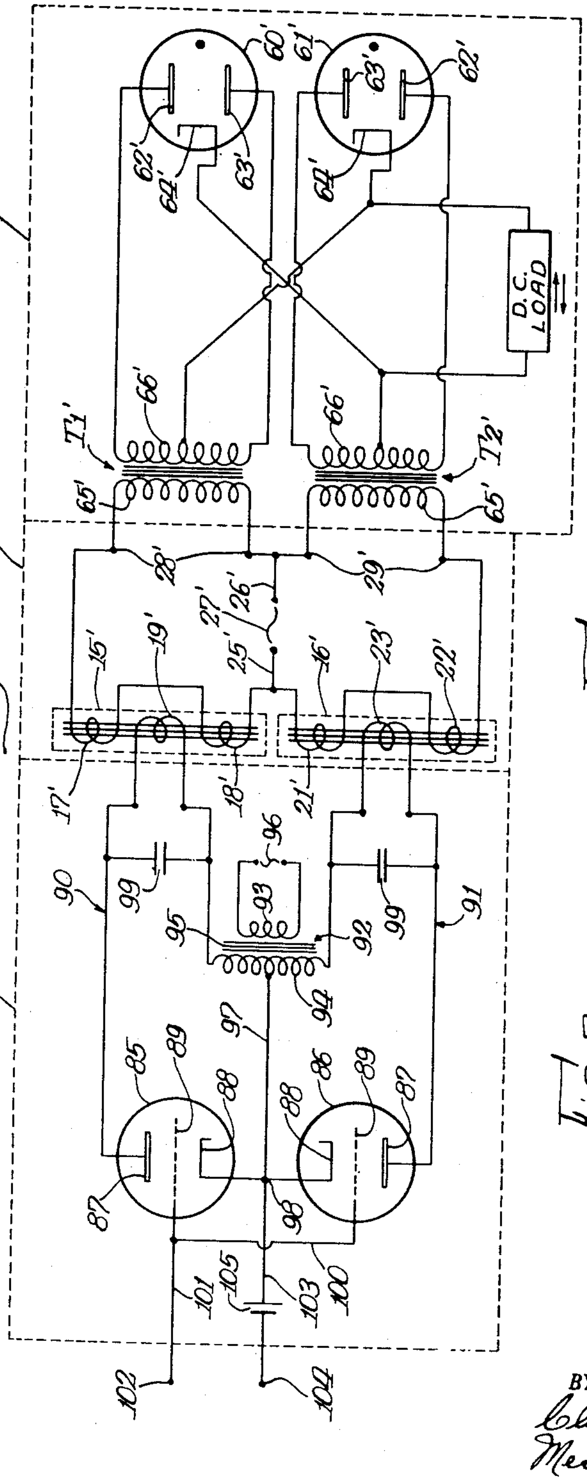
Fig. 6 is a circuit diagram illustrating another specific form that the units represented by the rectangles of Fig. 1 may take.
Figure 9:
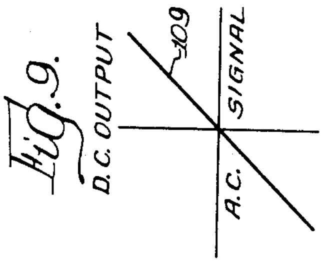
Fig. 9 is a diagram similar to Fig. 7 illustrating the character of the output of the third or final unit of Fig. 6.
Figure 8:
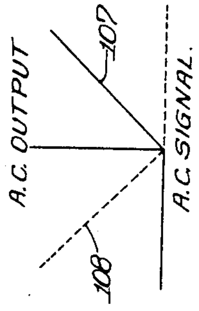
Fig. 8 is a diagram similar to Fig. 7 illustrating the character of the output of the second unit of Fig. 6.
Figure 7:
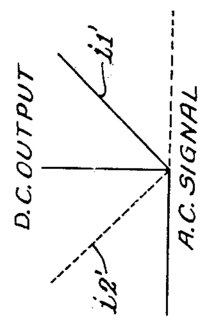
Fig. 7 is a diagram illustrating the character of the output of the first unit of Fig. 6.

In Figs. 6 to 9, inclusive, there is disclosed an embodiment of my invention in a circuit responding to or controlled by an A. C. signal. Such a circuit, like the circuit of Fig. 2, may have an A. C. output or a D. C. output. Referring to Fig. 6, the circuit therein disclosed is composed of a saturable reactor circuit A′, an input signal amplifying and modifying unit or subcircuit B′, and a rectifier unit C′. The saturable reactor circuit or the unit A′ is identical with the unit A shown in Fig. 2. Suffice it to say, therefore, that the unit A′ is composed of two saturable reactors 15′ and 16′ and that the reactor 15′ has two A. C. coils 17′ and 18′ and a D. C. or control coil 19′, and that the reactor 16′ has two A. C. coils 21′ and 22′ and a D. C. or control coil 23′. Completing the saturable reactor circuit is a supply circuit having power leads 25′ and 26′ connected to a source of alternating current power, represented at 27′ and two sets of output terminals 28′ and 29′. The coils are connected as described in connection with Fig. 2.

Unit B′, the signal input circuit, like the unit B of Fig. 2, is adapted to receive the input or control signal, amplify it so as to convert it to a value capable of use with saturable reactors, and modify or condition the signal for use with saturable reactors and to accomplish the end here sought. Such modification in this form of the invention involves conversion of the signal from A. C. to D. C.; the character of the input signal being appropriate. Herein the unit B′ must be such as to result in a current in the D. C. windings 19′ and 23′ of the character illustrated in Fig. 7 in which, for example, $i1'$ represents the current in coil 19′ and $i2'$ represents the current in coil 23′. In other words, at zero signal, neither coil 19′ nor coil 23′ should be energized; with a signal, one or the other of the control coils 19′ and 23′ should be energized, depending upon the sign of the input signal; but never should both coils be energized simultaneously. Moreover, the magnitude of the current should be proportional to the magnitude of the input signal.

Shown in Fig. 6 for exemplary purposes only, it being understood that a variety of other circuits might be employed and that, in particular, it might be necessary to provide more than a single amplification stage, is one specific embodiment that the unit B′ may take. As shown in that figure, unit B′ comprises a pair of grid controlled, electron tubes 85 and 86, each having a plate 87, a cathode 88 and a grid 89. The tube 85 has a plate circuit, generally designated 90, having therein the D. C. coil 19′ of the saturable reactor 15′. The tube 86 has a plate circuit, generally designated 91, which has connected therein the D. C. coil 23′ of the saturable reactor 16′. Alternating current plate potential is herein employed and is provided through the medium of a transformer 92 having a primary winding 93, a secondary winding 94 and a core 95. The primary winding 93 is connected to a source of alternating current represented at 96 and the secondary winding 94 is connected in the plate circuits. A lead 97 extends from the midpoint of the secondary winding 94 to a juncture point 98 of the cathodes 88 to complete the plate circuits. If desired, each of the plate circuits includes a condenser 99 connected in parallel with the D. C. coil and operating in well known manner to cause flow of unidirectional current during the negative half cycle of the plate voltage of the tube with which the condenser is associated. The grids 89 are interconnected by a lead 100 from which extends a lead 101 ending in a terminal 102 constituting one of a pair of signal input terminals. Connected to the juncture point 98 is a lead 103 ending in a terminal 104 constituting the other one of the pair of signal input terminals. Interposed in the lead 103 is a small source of D. C. potential, herein represented as a battery 105, serving as a grid bias. This grid bias is adjusted to cause both tubes to cut off at zero magnitude of input signal. Though not here shown, it is to be appreciated that the tubes 85 and 86 are provided with suitable means for heating the cathodes 88.

As above stated, the tubes are so biased as to cut off at zero signal and hence at zero signal there is no current flow in either plate circuit. A signal of any value other than zero will cause conduction of one or the other of the tubes 85 and 86, depending upon the sign of the signal. In view of the nature of the tubes 85 and 86, the current flow therethrough varies with the magnitude of the input signal. Hence there results a D. C. output of the unit B′ having the characteristic shown in Fig. 7, namely, no current in either coil 19′ or 23′ at zero signal and current of a magnitude proportional to the magnitude of the input signal in one or the other coil, depending upon the sign of the signal, at any signal above zero magnitude.

A brief description of the operation of the circuit of Fig. 6, as thus far described, may facilitate understanding of the invention and appreciation of the advantages thereof. Let it be assumed, therefore, that the input signal is zero. Under that condition, there will be no flow of current in the D. C. coils 19′ and 23′. The saturable reactors 15 and 16 will then be at full impedance and there will be no material difference in potential across either pair of output terminals. Let it be assumed further that the A. C. input signal is now increased from zero to some definite magnitude and that the sign of the input signal is such that the signal will lie to the right of the vertical axis of the graph of Fig. 8. Under that assumption, the tube 85 will conduct and the current i1′ flowing in the D. C. winding 19′ will rise from zero to a value lying on the line i1′ represented in Fig. 7 corresponding to the magnitude of the input signal. The current i2′ flowing in the winding 23′ will remain zero. Hence the potential difference across the terminal 29′ will remain as at zero signal but the impedance of reactor 15′ will be lowered and hence the potential difference across the terminals 28′ will be increased. In other words, with a load connected to each of the pair of output terminals there would be output at terminals 28′ but no material output at terminals 29′. Conversely, if the sign of the input signal is reversed and the signal then increased in magnitude as before, the tube 86 will conduct and the current i2′ flowing in the D. C. winding 23′ will rise from zero to a value proportional to the magnitude of the input signal. With such change in sign of the signal, the tube 85 will cease firing and the current i1′ flowing in the winding 19′ will return to zero magnitude. Hence the result will be reversed with output at the terminals 29′ but no output at the terminals 28′. In either case, as the signal magnitude is changed the magnitude of the current i1′ or i2′ is changed and, likewise, the output at terminals 28′ or 29′. It will be apparent, therefore, that there will be obtained an output of the character represented in Fig. 8, namely, an output which is zero at zero signal, but at any other signal magnitude has a value dependent upon signal magnitude; the output appearing selectively at the terminals 28′ or 29′ dependent upon the sign of the signal. The output is thus represented by the lines 107 and 108 in Fig. 8. This circuit thus has output of the same character as is obtained by the corresponding portion of the circuit of Fig. 2, but with control by an A. C. signal rather than by a D. C. signal. The circuit results in control similar to that of a selector rheostat but obtains that control by means of an A. C. signal.

The final output of the circuit of Fig. 6 is a D. C. output corresponding in magnitude to the magnitude of the A. C. input signal and with a sign or polarity corresponding to the sign of the A. C. input signal. To that end, a rectifier circuit or unit C′ is connected as the loads of the saturable reactor circuit or unit A′. The unit C′ is identical with the unit C of Fig. 2. Suffice it to say, therefore, that the rectifier C′ comprises two full wave rectifier tubes 60′ and 61′ each having two plates 62′ and 63′ and a cathode 64′. To provide the two loads for connection to the terminals 28′ and 29′ the rectifier includes two transformers T1′ and T2′ each with a primary winding 65′ and a secondary winding 66′. The tubes are so connected that one functions when the output is at the terminals 28′ and the other functions when the output is at the terminals 29′, the polarity or sign of the output being reversed.

With this full wave rectification, the D. C. output of the circuit will correspond to the A. C. output of the saturable reactor circuit and, inasmuch as this latter output has already been shown to be proportional to the magnitude of the A. C. signal (see Fig. 8), the D. C. or end output of the entire circuit will also be proportional to the magnitude of the A. C. input signal. Further, with the sign of the input signal determining output at terminals 28′ or 29′ and with the selective output of unit A′ determining the sign of the output of the rectifier C′, the D. C. or end output of the entire circuit will also correspond to the sign of the A. C. input signal. Accordingly, there results an output of the character represented by the line 109 of Fig. 9.

I claim as my invention:

1. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit for a pair of A. C. loads adapted for connection to a single power source, the A. C. coils of said reactors being connected in the supply circuit so that each reactor controls the output to one only of the loads, and a full wave rectifier circuit connected to form the loads for said supply circuit and having output terminals for the connection of a D. C. load thereto, the output of said rectifier circuit corresponding in magnitude and sign with the magnitude and sign of the input signal.

2. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having an A. C. coil and a control coil, said control coils being connected one to each set of output terminals of said input circuit and an A. C. supply circuit having two sets of output terminals and adapted for connection to a single A. C. power source, the A. C. coil of each reactor being connected in series with one only of the sets of output terminals of said saturable reactor circuit, and a full wave rectifier circuit connected to said sets of output terminals to form the loads for said saturable reactor circuit and having a single set of output terminals for the connection of a D. C. load thereto, the output of said rectifier circuit corresponding in magnitude and sign with the magnitude and sign of the input signal.

3. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being connected one to each set of output terminals of said input circuit and a pair of A. C. supply circuits each adapted for the connection of an A. C. load therein and to an A. C. power source common to said supply circuits, the A. C. coils of each reactor being connected in series with one another and in series with the load in each supply circuit, and a full wave rectifier circuit connected to form the loads for said supply circuit and having output terminals for the connection of a D. C. load thereto, the output of said rectifier circuit corresponding in magnitude and sign with the magnitude and sign of the input signal.

4. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit having two sets of output terminals and adapted for connection to a single A. C. power source, the A. C. coils of said reactors being connected in said supply circuit and operating in response to the sign of the input signal to determine at which set of terminals of said supply circuit the output is to occur, and a rectifier circuit forming the loads for said saturable reactor circuit comprising a pair of inductive coupling means connected one to each set of output terminals of said reactor circuit, a pair of full wave rectifier tubes and a circuit having a single pair of output terminals and having said coupling means and said tubes connected therein to furnish at said last named terminals rectified output of a magnitude dependent upon the signal magnitude and of a polarity varying with the sign of the input signal.

5. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having an A. C. coil and a control coil, said control coils being connected one to each set of output terminals of said input circuit, and an A. C. supply circuit having two sets of output terminals and adapted for connection to a single A. C. power source, the A. C. coils of said reactors being connected in said supply circuit and operating in response to the sign of the input signal to determine at which set of terminals of said supply circuit the output is to occur, and a rectifier circuit forming the loads for said saturable reactor circuit comprising a pair of transformers each having a primary and a secondary winding, the primary of each transformer being connected to one set of terminals of said reactor circuit, and a pair of full wave rectifier tubes each having a pair of plates and a cathode, each of said tubes having the plates connected to the ends of the secondary winding of one of said transformers and its cathode connected to the midpoint of the secondary winding of the other of said transformers, and a pair of output terminals connected to the cathodes of said tubes.

6. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being connected one to each set of output terminals of said input circuit and a pair of A. C. supply circuits each adapted for the connection of an A. C. load therein and to an A. C. power source common to said supply circuits, the A. C. coils of each reactor being connected in series with one another and in series with the load in each supply circuit, and a rectifier circuit forming the loads for said saturable reactor circuit comprising a pair of inductive coupling means connected one to each set of output terminals of said reactor circuit, a pair of full wave rectifier tubes and a circuit having a single pair of output terminals and having said coupling means and said tubes connected therein to furnish at said last named terminals rectified output of a magnitude dependent upon the signal magnitude and of a polarity varying with the sign of the input signal.

7. An electrical control circuit comprising a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being connected one to each set of output terminals of said input circuit and a pair of A. C. supply circuits each adapted for the connection of an A. C. load therein and to an A. C. power source common to said supply circuits, the A. C. coils of each reactor being connected in series with one another and in series with the load in each supply circuit, and a rectifier circuit forming the loads for said saturable reactor circuit comprising a pair of transformers each having a primary and a secondary winding, the primary of each transformer being connected to one set of terminals of said reactor circuit, and a pair of full wave rectifier tubes each having a pair of plates and a cathode, each of said tubes having the plates connected to the ends of the secondary winding of one of said transformers and its cathode connected to the midpoint of the secondary winding of the other of said transformers, and a pair of output terminals connected to the cathodes of said tubes.

8. In an electrical control circuit, a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, and a saturable reactor circuit comprising a pair of saturable reactors each having a control coil and an A. C. coil, said control coils being connected one to each set of output terminals of said input circuit, and an A. C. supply circuit having two sets of output terminals and adapted to be connected to a single source of A. C. power common to said last named sets of output terminals and the A. C. coils of said reactors, the A. C. coils of said reactors being so connected in said supply circuit as to cause selection of output at one or the other sets of terminals of said saturable reactor circuit in accordance with the sign of the input signal.

9. In an electrical control circuit, a signal input circuit having two sets of output terminals and two electron tubes each of the variable output vacuum type and operable with a signal present to produce at one or the other only of the sets of terminals a direct current of a magnitude proportional to the magnitude of the input signal, the set of output terminals at which current is produced being determined by the sign of the input signal, and a saturable reactor circuit comprising a pair of saturable reactors each having a pair of A. C. coils and a control coil wound on a common core, the A. C. coils being so arranged as not to induce an A. C. voltage in the associated control coil, said control coils being connected one to each set of output terminals of said input circuit and a pair of A. C. supply circuits each adapted for the connection of an A. C. load therein and to an A. C. power source common to said supply circuits, the A. C. coils of said reactor being connected in series with one another and in series with the load in each supply circuit.

10. An electrical control circuit comprising a signal input circuit including a pair of grid controlled electron tubes of the vacuum type each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, a saturable reactor circuit comprising a pair of saturable reactors each having an A. C. coil and a control coil, said control coils being connected one to each set of output terminals of said input circuit, and an A. C. supply circuit for a pair of A. C. loads adapted to have a single power source, the A. C. coils of said reactors being connected in the supply circuit so that each reactor controls the output to one of the loads, and a full wave rectifier circuit connected to form the loads for said supply circuit and having output terminals for the connection of a D. C. load thereto, the output of said rectifier circuit corresponding in magnitude and sign with the magnitude and sign of the input signal.

11. In an electrical control circuit, a signal input circuit including a pair of grid controlled electron tubes of the vacuum type each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, and a saturable reactor circuit comprising a pair of saturable reactors each having an A. C. coil and a control coil, said control coils being connected one to each set of output terminals of said input circuit and an A. C. supply circuit having two sets of output terminals and adapted for connection to a single A. C. power source, the A. C. coil of each reactor being connected in series with one of the sets of output terminals of said saturable reactor circuit.

12. An electrical control circuit comprising a D. C. signal input circuit including a pair of grid controlled electron tubes each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, a saturable reactor circuit comprising a pair of saturable reactors each having an A. C. coil and a control coil, said control coils being electrically associated one with each set of output terminals of said input circuit and an A. C. supply circuit having two sets of output terminals and a single A. C. power source, the A. C. coil of each reactor being connected in series with one of the sets of output terminals of said saturable reactor circuit, a full wave rectifier circuit connected to said sets of output terminals to form the loads for said saturable reactor circuit and having a single set of output terminals for the connection of a D. C. load thereto, the output of said rectifier circuit corresponding in magnitude and sign with the magnitude and sign of the input signal, and a negative feed-back from the output terminals of said rectifier circuit to said signal input circuit.

13. An electrical control circuit comprising a D. C. signal input circuit including a pair of grid controlled electron tubes each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, a saturable reactor circuit comprising a pair of saturable reactors each having an A. C. coil and a control coil, said control coils being electrically associated one with each set of output terminals of said input circuit and an A. C. supply circuit having two sets of output terminals and a single A. C. power source, the A. C. coil of each reactor being connected in series with one of the sets of output terminals of said saturable reactor circuit, and a full wave rectifier circuit connected to said sets of output terminals to form the loads for said saturable reactor circuit and having a single set of output terminals for the connection of a D. C. load thereto, the output of said rectifier circuit corresponding in magnitude and sign with the magnitude and sign of the input signal.

14. An electrical control circuit comprising a D. C. signal input circuit including a pair of grid controlled electron tubes each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being electrically associated one with each set of output terminals of said input circuit and a pair of A. C. supply circuits each adapted for the connection of an A. C. load therein and an A. C. power source common to said supply circuits, the A. C. coils of each reactor being connected in series with one another and in series with the load in each supply circuit, and a full wave rectifier circuit connected to form the loads for said supply circuit and having output terminals for the connection of a D. C. load thereto, the output of said rectifier circuit corresponding in magnitude and sign with the magnitude and sign of the input signal.

15. An electrical control circuit comprising a D. C. signal input circuit including a pair of grid controlled electron tubes each having a plate circuit with output terminals, means common to the plate circuits for providing the plate potential for said tubes, a pair of signal input terminals and means common to said tubes biasing the same to cut off at zero input signal whereby there is produced at one or the other only of the sets of output terminals, dependent upon the sign of the input signal, a direct current proportional to the magnitude of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being electrically associated one with each set of output terminals of said input circuit, and an A. C. supply circuit having two sets of output terminals and a single A. C. power source, the A. C. coils of said reactors being connected in said supply circuit and operating in response to the sign of the input signal to determine at which set of terminals of said supply circuit the output is to occur, and a rectifier circuit forming the loads for said saturable reactor circuit comprising a pair of transformers each having a primary and a secondary winding, the primary of each transformer being connected to one set of terminals of said reactor circuit, and a pair of full wave rectifier tubes each having a pair of plates and a cathode, each of said tubes having the plates connected to the ends of the secondary winding of one of said transformers and its cathode connected to the midpoint of the secondary winding of the other of said transformers, and a pair of output terminals connected to the cathodes of said tubes.

16. An electrical control circuit comprising a D. C. signal input circuit including a pair of grid controlled electron tubes each having a plate, a cathode and a grid, a plate circuit for each of said tubes, a D. C. voltage source common to said plate circuits for supplying the plate voltage, a grid circuit for each of said tubes and a D. C. voltage source common to said grid circuits biasing said tubes to cut off at zero magnitude of input signal, a saturable reactor circuit comprising a pair of saturable reactors each having an A. C. coil and a control coil, said control coils being electrically associated one with each of said plate circuits to receive the output of the associated tube and an A. C. supply circuit having two sets of output terminals and a single A. C. power source, the A. C. coil of each reactor being connected in series with one of the sets of output terminals of said saturable reactor circuit, and a full wave rectifier circuit connected to said sets of output terminals to form the loads for said saturable reactor circuit and having a single set of output terminals for the connection of a D. C. load thereto, the output of said rectifier circuit corresponding in magnitude and sign with the magnitude and sign of the input signal.

17. In an electrical control circuit, a D. C. signal input circuit including a pair of grid controlled electron tubes each having a plate, a cathode and a grid, a plate circuit for each of said tubes, a D. C. voltage source common to said plate circuits for supplying the plate voltage, a grid circuit for each of said tubes and a D. C. voltage source common to said grid circuits biasing said tubes to cut off at zero magnitude of input signal, and a saturable reactor circuit comprising a pair of saturable reactors each having an A. C. coil and a control coil, said control coils being electrically associated one with each of said plate circuits to receive the output of the associated tube and an A. C. supply circuit having two sets of output terminals and a single A. C. power source, the A. C. coil of each reactor being connected in series with one of the sets of output terminals of said saturable reactor circuit.

18. In an electrical control circuit, a D. C. signal input circuit including a pair of grid controlled electron tubes each having a plate, a cathode and a grid, a plate circuit for each of said tubes, a D. C. voltage source common to said plate circuits for supplying the plate voltage, a grid circuit for each of said tubes and a D. C. voltage source common to said grid circuits biasing said tubes to cut off at zero magnitude of input signal, and a saturable reactor circuit comprising a pair of saturable reactors each having a pair of A. C. coils and a control coil wound on a common core, the A. C. coils being so arranged as not to induce an A. C. voltage in the associated control coil, said control coils being electrically associated one with each of said plate circuits to receive the output of the associated tube, and a pair of A. C. supply circuits each adapted for the connection of an A. C. load therein and an A. C. power source common to said supply circuits, the A. C. coils of each reactor being connected in series with one another and in series with the load in each supply circuit.

19. An electrical control circuit comprising an A. C. signal input circuit including a pair of grid controlled electron tubes each having a plate circuit with output terminals, means common to the plate circuits for providing the plate potential for said tubes, a pair of signal input terminals and means connected to said tubes biasing the same to cut off at zero input signal whereby there is produced in one or the other only of the sets of output terminals, dependent upon the sign of the input signal, a direct current proportional to the magnitude of the input signal, a saturable reactor circuit comprising a pair of saturable reactors each having an A. C. coil and a control coil, said control coils being electrically associated one with each set about the terminals of said input circuit and an A. C. supply circuit having two sets of output terminals and a single A. C. power source, the A. C. coil of each reactor being connected in series with one of the sets of output terminals of said saturable reactor circuit, and a full wave rectifier circuit connected to sets of output terminals to form the loads for said saturable reactor circuit and having a single set of output terminals for the connection of a D. C. load thereto, the output of said rectifier circuit corresponding in magnitude and sign with the magnitude and sign of the input signal.

20. An electrical control circuit comprising an A. C. signal input circuit including a pair of grid controlled electron tubes each having a plate circuit with output terminals, means common to the plate circuits for providing the plate potential for said tubes, a pair of signal input terminals and means connected to said tubes biasing the same to cut off at zero input signal whereby there is produced in one or the other only of the sets of output terminals, dependent upon the sign of the input signal, a direct current proportional to the magnitude of the input signal, a saturable reactor circuit comprising a pair of saturable reactors each having an A. C. coil and a control coil, said control coils being electrically associated one with each set about the terminals of said input circuit and an A. C. supply circuit having two sets of output terminals and a single A. C. power source, the A. C. coil of each reactor being connected in series with one of the sets of output terminals of said saturable reactor circuit, a pair of A. C. coils and a control coil wound on a common core, the A. C. coils being so arranged as not to induce an A. C. voltage in the associated control coil, said control coils being electrically associated one with each of said plate circuits to receive the output of the associated tube, and a pair of A. C. supply circuits each adapted for the connection of an A. C. load therein and an A. C. power source common to said supply circuits, the A. C. coils of each reactor being connected in series with one another and in series with the load in each supply circuit, and a full wave rectifier circuit connected to sets of output terminals to form the loads for said saturable reactor circuit and having a single set of output terminals for the connection of a D. C. load thereto, the output of said rectifier circuit corresponding in magnitude and sign with the magnitude and sign of the input signal.

21. An electrical control circuit comprising an A. C. signal input circuit including a pair of grid controlled electron tubes each having a plate circuit with output terminals, means common to the plate circuits for providing the plate potential for said tubes, a pair of signal input terminals and means connected to said tubes biasing the same to cut off at zero input signal whereby there is produced in one or the other only of the sets of output terminals, dependent upon the sign of the input signal, a direct current proportional to the magnitude of the input signal, a saturable reactor circuit comprising a pair of saturable reactors each having a pair of A. C. coils and a control coil wound on a common core, the A. C. coils being so arranged as not to induce an A. C. voltage in the associated control coil, said control coils being electrically associated one with each of said plate circuits to receive the output of the associated tube, and a pair of A. C. supply circuits each adapted for the connection of an A. C. load therein and an A. C. power source common to said supply circuits, the A. C. coils of each reactor being connected in series with one another and in series with the load in each supply circuit, and a rectifier circuit forming the loads for said saturable reactor circuit comprising a pair of transformers each having a primary and a secondary winding, the primary of each transformer being connected to one set of terminals of said reactor circuit, and a pair of full wave rectifier tubes each having a pair of plates and a cathode, each of said tubes having the plates connected to the ends of the secondary winding of one of said transformers and its cathode connected to the midpoint of the secondary winding of the other of said transformers, and a pair of output terminals connected to the cathodes of said tubes.

22. An electrical control circuit comprising an A. C. signal input circuit including a pair of grid controlled electron tubes each having a plate, a cathode and a grid, a plate circuit for each of said tubes, an A. C. voltage source for supplying the plate voltage for said tubes, and a D. C. voltage source common to said tubes and biasing said tubes to cut off at zero magnitude of input signal, a saturable reactor circuit comprising a pair of saturable reactors each having an A. C. coil and a control coil, said control coils being electrically associated one with the plate circuit of each of said tubes and an A. C. supply circuit having two sets of output terminals and a single A. C. power source, the A. C. coil of each reactor being connected in series with one of the sets of output terminals of said saturable reactor circuit, and a full wave rectifier circuit connected to the output terminals to form the loads for said saturable reactor circuit and having a single set of output terminals for the connection of a D. C. load thereto, the output of said rectifier circuit corresponding in magnitude and sign with the magnitude and sign of the input signal.

23. In an electrical control circuit, an A. C. signal input circuit including a pair of grid controlled electron tubes each having a plate, a cathode and a grid, a plate circuit for each of said tubes, an A. C. voltage source for supplying the plate voltage for said tubes, and a D. C. voltage source common to said tubes and biasing said tubes to cut off at zero magnitude of input signal, and a saturable reactor circuit comprising a pair of saturable reactors each having an A. C. coil and a control coil, said control coils being electrically associated one with the plate circuit of each of said tubes and an A. C. supply circuit having two sets of output terminals and a single A. C. power source, the A. C. coil of each reactor being connected in series with one of the sets of output terminals of said saturable reactor circuit.

24. In an electrical control circuit, an A. C. signal input circuit including a pair of grid controlled electron tubes each having a plate, a cathode and a grid, a plate circuit for each of said tubes, an A. C. voltage source for supplying the plate voltage for said tubes, and a D. C. voltage source common to said tubes and biasing said tubes to cut off at zero magnitude of input signal, and a saturable reactor circuit comprising a pair of saturable reactors each having a pair of A. C. coils and a control coil wound on a common core, the A. C. coils being so arranged as not to induce an A. C. voltage in the associated control coil, said control coils being electrically associated one with each of said plate circuits to receive the output of the associated tube, and a pair of A. C. supply circuits each adapted for the connection of an A. C. load therein and an A. C. power source common to said supply circuits, the A. C. coils of each reactor being connected in series with one another and in series with the load in each supply circuit.

25. In an electrical control circuit, an A. C. signal input circuit including a pair of grid controlled electron tubes each having a plate, a cathode and a grid, a plate circuit for each of said tubes, means for providing an alternating current plate voltage for said tubes comprising an A. C. voltage source and a transformer having a primary winding connected to said voltage source and a secondary winding connected with a half thereof in each of said plate circuits, a common lead being connected at one end to the midpoint of said secondary winding and at the other end to a juncture point of said cathodes to complete said plate circuits, a pair of signal input terminals one of which is common to the grids of said tubes and the other of which is connected to the juncture point of said cathodes and a D. C. voltage source interposed between said last named input terminal and the juncture point of said cathodes to bias said tubes to cut off at zero input signal, and a saturable reactor circuit comprising a pair of saturable reactors each having an A. C. coil and a control coil, said control coils being electrically associated one with each of said plate circuits to receive the output of the associated tube, and an A. C. supply circuit having two sets of output terminals and a single A. C. power source, the A. C. coil of each reactor being connected in series with one of the sets of output terminals of said saturable reactor circuit.

PAUL GLASS.

REFERENCES CITED

The following references are of record in the file of this patent:

UNITED STATES PATENTS

| Number | Name | Date |
|---|---|---|
| 1,948,372 | Fitzgerald | Feb. 20, 1934 |
| 1,955,322 | Brown | Apr. 17, 1934 |
| 2,164,383 | Burton | July 4, 1939 |
| 2,247,983 | Barth | July 1, 1941 |
| 2,302,834 | Bliss | Nov. 24, 1942 |